US010519364B2

United States Patent
Stephens et al.

(10) Patent No.: US 10,519,364 B2
(45) Date of Patent: Dec. 31, 2019

(54) PROPPANT AGGREGATE PARTICULATES FOR USE IN SUBTERRANEAN FORMATION OPERATIONS

(71) Applicant: Halliburton Energy Services, Inc., Houston, TX (US)

(72) Inventors: Walter T. Stephens, Houston, TX (US); Philip D. Nguyen, Houston, TX (US); Michael Wayne Sanders, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/759,799

(22) PCT Filed: Oct. 30, 2015

(86) PCT No.: PCT/US2015/058383
§ 371 (c)(1),
(2) Date: Mar. 13, 2018

(87) PCT Pub. No.: WO2017/074432
PCT Pub. Date: May 4, 2017

(65) Prior Publication Data
US 2018/0244983 A1    Aug. 30, 2018

(51) Int. Cl.
*E21B 43/267* (2006.01)
*C09K 8/80* (2006.01)

(52) U.S. Cl.
CPC .............. *C09K 8/80* (2013.01); *E21B 43/267* (2013.01)

(58) Field of Classification Search
CPC .................................. C09K 8/80; E21B 43/267
USPC ........................................................ 166/280.2
See application file for complete search history.

(56) References Cited

U.S. PATENT DOCUMENTS

| | | | |
|---|---|---|---|
| 6,725,931 B2 | 4/2004 | Nguyen et al. | |
| 6,729,404 B2 | 5/2004 | Nguyen et al. | |
| 6,962,200 B2 | 11/2005 | Nguyen et al. | |
| 7,040,403 B2 | 5/2006 | Nguyen et al. | |
| 7,264,052 B2 | 9/2007 | Nguyen et al. | |
| 7,281,581 B2 | 10/2007 | Nguyen et al. | |
| 7,325,608 B2 | 2/2008 | van Batenburg et al. | |
| 7,581,590 B2 | 9/2009 | Lesko et al. | |
| 7,874,360 B2 | 1/2011 | Welton et al. | |
| 8,066,068 B2 | 11/2011 | Lesko et al. | |
| 8,113,283 B2 | 2/2012 | Welton et al. | |

(Continued)

OTHER PUBLICATIONS

International Standard ISO 13503-2, "Petroleum and natural gas industries—Completion fluids and materials—Part 2: Measurement of properties of proppants used in hydraulic fracturing and gravel-packing operations, Amendment 1: Addition of Annex B: Proppand specification," Nov. 2009, 10 pages.

(Continued)

*Primary Examiner* — Silvana C Runyan
(74) *Attorney, Agent, or Firm* — McGuireWoods LLP

(57) ABSTRACT

Proppant aggregates comprising proppant particulates and a binding agent, wherein the proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 50° F.

25 Claims, 1 Drawing Sheet

(56) References Cited

U.S. PATENT DOCUMENTS

| | | | |
|---|---|---|---|
| 2005/0194137 A1* | 9/2005 | Nguyen | C09K 8/508 166/276 |
| 2006/0048944 A1* | 3/2006 | van Batenburg | C09K 8/62 166/308.1 |
| 2006/0081371 A1* | 4/2006 | Duenckel | C09K 8/80 166/280.2 |
| 2006/0089266 A1* | 4/2006 | Dusterhoft | C09K 8/68 507/219 |
| 2006/0118300 A1* | 6/2006 | Welton | C09K 8/68 166/276 |
| 2007/0036977 A1 | 2/2007 | Sinclair et al. | |
| 2007/0114029 A1 | 5/2007 | Kazi | |
| 2007/0209794 A1 | 9/2007 | Kaufman et al. | |
| 2008/0283243 A1* | 11/2008 | Rediger | C09K 8/805 166/276 |
| 2009/0178807 A1 | 7/2009 | Kaufman et al. | |
| 2013/0161003 A1 | 6/2013 | Makarychev-Mikhailov et al. | |

OTHER PUBLICATIONS

International Standard ISO 13503-5, "Measuring the Long-term Conductivity of Proppants, Part 5: Procedures for measuring the long-term conductivity of proppants" Jul. 2008, 36 pages.

International Standard ISO 13503-2, "Petroleum and natural gas industries—Completion fluids and materials—Part 2: Measurement of properties of proppants used in hydraulic fracturing and gravel-packing operations, ANSI/API Recommended Practice 19C," First Edition, May 2008, 42 pages.

International Search Report and Written Opinion from PCT/US2015/058404, dated May 13, 2016, 12 pages.

* cited by examiner

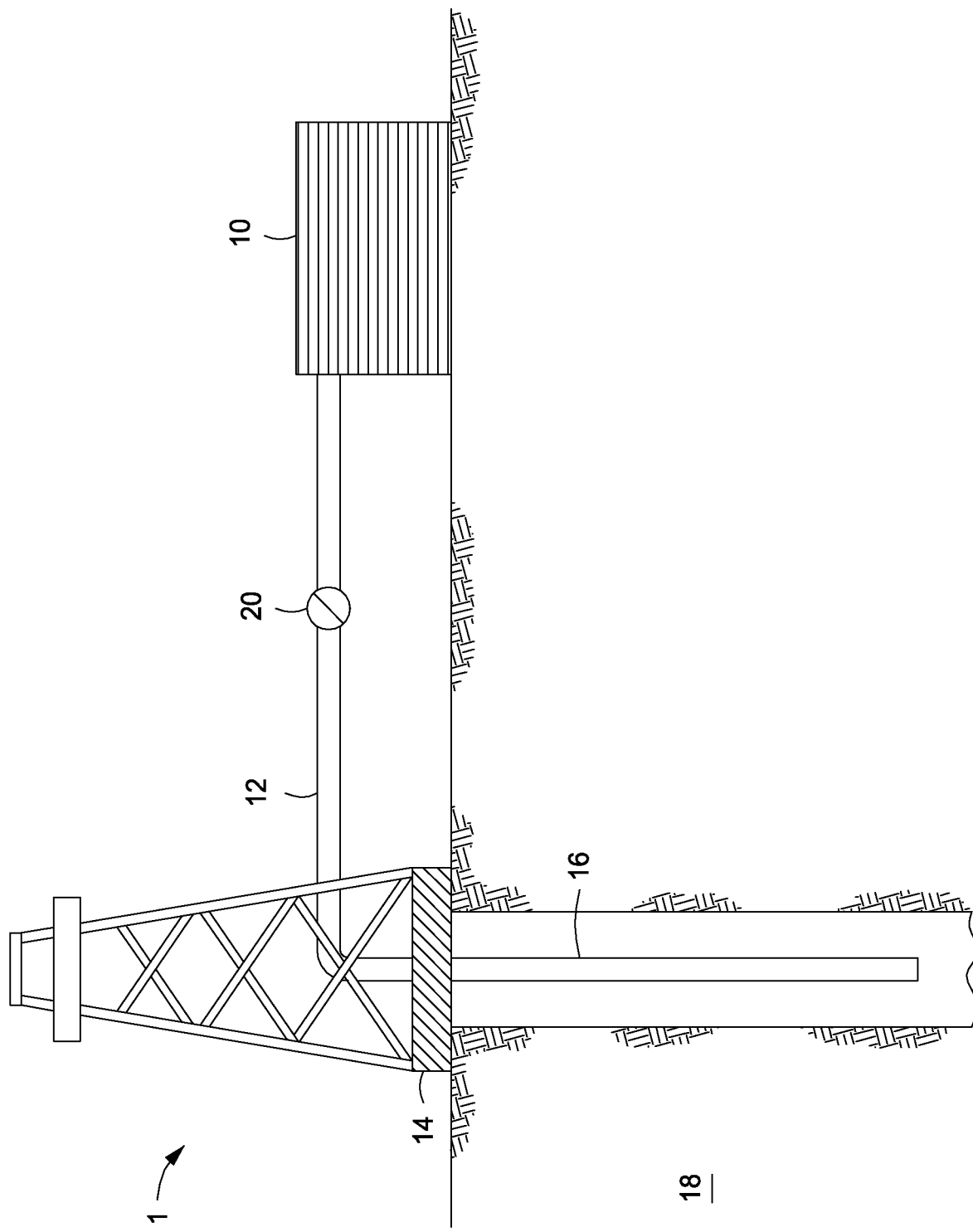

PROPPANT AGGREGATE PARTICULATES FOR USE IN SUBTERRANEAN FORMATION OPERATIONS

BACKGROUND

The embodiments herein relate to subterranean formation operations and, more particularly, to proppant aggregate particulates for use in subterranean formation operations.

Hydrocarbon producing wells (e.g., oil producing wells, gas producing wells, and the like) are created and stimulated using various treatment fluids introduced into the wells to perform a number of subterranean formation operations. The general term "treatment fluid," as used herein, refers generally to any fluid that may be used in a subterranean application in conjunction with a desired function and/or for a desired purpose. The term "treatment fluid" does not imply any particular action by the fluid or any component thereof.

Stimulation of hydrocarbon producing wells often involves introducing a fracturing treatment fluid, sometimes called a carrier treatment fluid when particulates entrained therein. The fracturing treatment fluid is pumped into a portion of a subterranean formation (which may also be referred to herein simply as a "formation") above a fracture gradient sufficient to break down the formation and create one or more fractures therein. As used herein, the term "fracture gradient" refers to a pressure necessary to create or enhance at least one fracture in a subterranean formation. Continuing to pump fluid will result in dilation and propagation of the fracture deep into the formation.

Typically, particulate solids are suspended in a portion of one or more treatment fluids and then deposited into the fractures deep within the formation. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

To enhance the conductivity of a fracture, individual proppant particulates may be formed into proppant aggregates. As used herein, the term "proppant aggregate" refers to a coherent body of proppant particulates, such that the proppant aggregate does not tend to disperse into smaller bodies without the application of shear. The proppant aggregates may be placed into the fracture(s) in a spaced apart fashion to maintain sufficient integrity to hold open the fracture once the hydraulic pressure is removed and allow for the flow of produced fluids. The individual proppant aggregates exist apart from the other proppant aggregates, rather than forming a traditional proppant bed wherein each proppant particulate is nestled against neighboring proppant particulates. In this way, there is more space between the aggregates for fluids to flow, rather than only being able to flow between the interstitial spaces of neighboring particles in a traditional bed.

BRIEF DESCRIPTION OF THE DRAWINGS

The following FIGURES are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is a system configured for delivering the treatment fluids comprising the proppant aggregates described herein to a downhole location, according to one or more embodiments of the present disclosure.

DETAILED DESCRIPTION

The embodiments herein relate to subterranean formation operations and, more particularly, to proppant aggregate particles for use in subterranean formation operations.

The embodiments herein relate to the individual proppant particulates used to form proppant aggregates. In traditional subterranean formation operations in which proppant particulates, either alone or in aggregate form, are used, the International Organization for Standardization (ISO) 13503 provides specifications for proppant particulates for use in hydraulic fracturing operations. Specifically, ISO 13503 provides fracturing proppant sizes, sphericity and roundness of proppant, acid solubility of proppant, maximum proppant turbidity, and maximum crush resistance for the material forming the proppant. (See ISO 13503-2, Amendment 1, 2006)). Accordingly, ISO 13503 provides the characteristics of proppant particulates used by the oil and gas industry for fracturing operations, and characteristics falling outside of these recommendations are generally deemed by the industry as unsatisfactory for use in such operations.

For example, ISO 13503 provides the requirement that a fracturing proppant be sized within a designated coarse sieve and a designated fine sieve, where not over 0.1% of the proppant particulates are larger than the coarse sieve and not over 1.0% are smaller than the fine sieve. For fracturing proppant, a minimum of 90% of the proppant particulates must pass the coarse sieve and be retained on the fine sieve. Proppant particulates, according to ISO 13503, require an average sphericity of 0.7 or greater and an average roundness of 0.7 or greater for ceramic proppant particulates and require an average sphericity of 0.6 or greater and an average roundness of 0.6 or greater for non-ceramic proppant particulates. ISO 13503 further specifies that fracturing proppant should generate not exceed (or produce less than) 10% of crushed material ("fines") upon application of the highest stress level. The methodology for testing proppant particulates to comply with ISO 13503 is the American Petroleum Institute (API) Recommended Practice (RP) 19C ($1^{st}$ ed., May 2008), providing "Measurement of Properties of Proppants Used in Hydraulic Fracturing and Gravel-packing Operations." API RP19D ($1^{st}$ ed., May 2008), "Measuring the Long-term Conductivity of Proppants," further provides tests and test apparatuses for establishing the long-term conductivity of proppant particulates used in fracturing operations according to ISO 13503. Each reference to API RP19C and 19D herein are derived from the $1^{st}$ ed., May 2008, whether or whether not specified.

The inventors of the present disclosure have discovered that the use of proppant particulates falling outside of one or more of the "standard" proppant characteristics provided in ISO 13503, but tested according to API RP19C and 19D, can be used to form superior proppant aggregates. The proppant aggregates of the present disclosure, for example, need only exhibit a preferred single property of mechanical strength, allowing the use of previously considered "subpar" particulates for use as proppant in forming such proppant aggregates. Accordingly, the proppant particulates for use in forming the proppant aggregates of the present disclosure may be more readily available and at a lower cost, without comprising strength and conductivity. Moreover, the proppant particulates of the present disclosure need not be derived from any particular geographical location, thus further reducing costs and availability limitations. Such proppant particulates have heretofore been considered unusable for proppant aggregate formation, in particular for a conductive solution for forming proppant aggregates.

The proppant aggregates described herein comprise proppant particulates and a binding agent. As used herein, the term "binding agent" refers to a substance that coats or otherwise surrounds wholly or partially a proppant particulate that can enhance grain-to-grain contact between other proppant particulates, which may be uncoated or also wholly or partially coated with the binding agent. Suitable binding agents for use in forming the proppant aggregates of the present disclosure may include, but are not limited to, a non-aqueous tackifying agent, an aqueous tackifying agent, a silyl-modified polyamide compound, a curable resin (e.g., an epoxy resin), a crosslinkable aqueous polymer composition, a polymerizable organic monomer composition, a zeta potential-modifying aggregating composition, a silicon-based resin, a consolidation agent emulsion, a cement, asphalt, petroleum distillates, petroleum waste products, and any combination thereof. A suitable commercially available binding agent includes, but is not limited to, EXPEDITE® resin, available from Halliburton Energy Services, Inc. in Houston, Tex. The binding agents described herein may be coated wholly or partially onto the proppant particulates by any means suitable for the binding agent and proppant particulates selected including, but not limited to, dry coating, wet coating, flash coating, and any combination thereof.

To form the proppant aggregates described herein, the binding agent is generally present in an amount of about 0.5% to about 20% either volume by weight (vol/wt), if the binding agent is a liquid, or weight by weight (wt/wt) if the binding agent is a solid or a solid and liquid mixture, of the proppant particulates, encompassing any value and subset therebetween. For example, the binding agent may be present in an amount of about 0.5%, about 1%, about 3%, or about 4%, or about 5%, or about 6%, or about 7%, or about 8%, or about 9%, or about 10%, or about 11%, or about 12%, or about 13%, or about 14%, or about 15%, or about 16%, or about 17%, or about 18%, or about 19% or about 20% vol/wt (or wt/wt) of the proppant particulates, encompassing any value and subset therebetween. Each of these values is critical to the embodiments of the present disclosure and may depend on a number of factors including, but not limited to, the type of proppant particulates selected, the type of binding agent selected, the aggregate operational conditions of the subterranean formation as described below, and the like, and any combination thereof. For example, a higher concentration of binding agent can result in a thick coating about the proppant particulates forming the proppant aggregates, thus allowing larger footprints at contact points between the grains resulting in higher strength (e.g., unconfined compressive, compressive deformation, transversal deformation, and the like). Additionally, a higher concentration of binding agent reduces the porosity or pores spaces of individual proppant particulates and/or the proppant aggregates themselves, thus additionally impacting conductivity, and porosity, permeability.

In some embodiments, the binding agent may further comprise a solid reinforcing agent. The solid reinforcing agent may increase the mechanical integrity of the binding agent, such as to elevated temperatures, elevated pressures, and the like, in a downhole environment. The solid reinforcing agents may be in any shape including, but not limited to, spherical-shaped, rod-shaped, fiber-shaped, flake-shaped, thin-film shaped, amorphous-shaped, and the like, and any combination thereof. Suitable solid reinforcing agents may be composed of a material including, but not limited to, a mineral, a metal, a polymer, a plastic, a salt, a glass, a comminuted plant material, any nano-particulate thereof, fine sand, microproppant, expandable rubber pellets (e.g., to accentuate the toughness or ductile strength of the proppant aggregates), and the like, and any combination thereof. Moreover, the solid reinforcing material may be itself degradable (or non-degradable).

The proppant aggregates formed using the proppant particulates and the binding agent described herein may be used to form channels within a fracture in a subterranean formation after the removal of hydraulic pressure therefrom (also referred to as "fracture closure"). The fracture may be a natural fracture or one created or enhanced during a fracturing operation. As used herein, the term "channel" refers to a solids-free or substantially solids-free area within a fracture between two adjacent proppant aggregates or between a proppant aggregate and a face of the subterranean formation. A "substantially solids-free channel" comprises no more than about 50% of solid particulates by volume of the volume of the channel. For example, the substantially solids-free channel comprises no more than about 50%, about 45%, about 40%, about 35%, about 30%, about 25%, about 20%, about 15%, about 10%, about 5%, or even 0% of solids particulates by volume of the volume of the channel. As will be described below with reference to testing according to API RP19C and 19D, such channels may be simulated in a testing cell, where the face of the subterranean formation may be simulated by the wall of the testing cell.

Accordingly, the channels form conductive pathways for produced fluids to flow to the surface for recovery. This is contrary to traditional proppant packs (formed with traditional proppant particulates according to ISO 13503), which fill the volume of the fracture and are in contact with the entire face of the formation forming the fracture. Thus, the mechanical requirements of traditional proppant particulates forming traditional proppant packs favors very strong particulates that are crush resistant and will not break under the closure stress and temperatures encountered downhole to maintain adequate conductivity. That is, if the proppant were to crush, the interstitial spaces between the individual particulates would become clogged and block fluid flow of produced fluids in traditional proppant packs. As used herein, the term "fracture closure stress" or simply "closure stress" refers to the mechanical force experienced by a proppant pack or a proppant aggregate in a fracture in a subterranean formation after hydraulic pressure has been removed and fluid production (e.g., hydrocarbon fluids) has begun.

The mechanical requirements of the proppant aggregates described herein must withstand closure stress and resist deformation to sustain the availability of the channels. Accordingly, it follows that the proppant particulates forming the proppant aggregates be similar in characteristics (e.g., strength) to those proppant particulates used in forming traditional proppant packs (e.g., where the strength of the individual proppant particulates lends strength to the proppant aggregates). Surprisingly, the inventors of the present disclosure have discovered that wholly different or wholly different combinations of characteristics of proppant particulates for forming the proppant aggregates compared to traditional proppant particulates not only allows adequate performance of the proppant aggregates, but in fact improves proppant aggregate performance. That is, the proppant particulate characteristics forming the proppant aggregates described herein are opposite to those characteristics preferred for use as traditional proppant particulates. Indeed, should the proppant particulates described herein be used in traditional proppant pack formation, they would exhibit poor performance structurally and conductively, whereas their use in forming proppant aggregates achieves heightened structural and conductive performance compared to high quality (those meeting ISO 13503 requirements) particulates. Accordingly, the proppant particulates forming the proppant aggregates of the present disclosure need not be themselves conductive to generate an economic benefit of collecting produced fluids from a subterranean formation, rather the proppant aggregates merely require suitable crush resistance to withstand or substantially withstand fracture closure stress.

The embodiments described herein provide multiple characteristics of proppant particulates that can be used to form the proppant aggregates described herein. It is to be understood that any one, multiple, or all of the proppant particulates may have any one, multiple, or all of characteristics described herein, without departing from the scope of the present disclosure, provided that at least the conductivity characteristics are met. Each of the characteristics is critical to the embodiments described herein, whether alone or in combination, as they allow the use of traditionally "subpar" particulates as fracture propping material.

In some embodiments, the present disclosure provides for a proppant aggregate comprising proppant particulates and a binding agent, as described above. The proppant particulates pack together to form the proppant aggregate in the presence of the binding agent. However, because the proppant particulates themselves are described in detail in the present disclosure, they may additionally be described in packed together form in the absence of the binding agent. That is, the characteristics of the proppant particulates are detailed herein both in the presence and absence of the binding agent.

In some embodiments, the proppant particulates described herein pack together in the absence of the binding agent to exhibit a conductivity of less than about 3000 millidarcy-feet (mD-ft) when exposed to operational conditions. As used herein, the term "conductivity" with reference to the proppant particulates of the present disclosure refers to the capacity of proppant particulates packed together to transmit fluid therethrough. As described herein, the conductivity of the proppant particulates is determined using API RP19D (1$^{st}$ ed., May 2008) based on Darcy's Law and Forchheimer's equations. Moreover, other means of determining conductivity (using Darcy's Law and Forchheimer's equations) may be used in accordance with the present disclosure to determine the desired characteristics of the proppant aggregates defined herein, without departing from the scope of the present disclosure. The conductivity of traditional proppant particulates is generally greater, sometimes exhibiting conductivities of greater than 3000 mD-ft, or greater than 4000 mD-ft, for example. As an example, it has been found that traditional proppant particulates indicate conductivity values of more than 3405 mD-ft at 10000 psi.

In some embodiments, the conductivity of the packed together proppant particulates in the absence of the binding agent exhibit a conductivity in the range of about 50 mD-ft to about 3000 mD-ft, encompassing any value and subset therebetween. For example, the packed together proppant particulates in the absence of the binding agent may exhibit a conductivity of about 50 mD-ft to about 500 mD-ft, or about 500 mD-ft to about 1000 mD-ft, or about 1000 mD-ft to about 1500 mD-ft, or about 1500 mD-ft to about 2000 mD-ft, or about 2000 mD-ft to about 2500 mD-ft, or about 2500 mD-ft to about 3000 mD-ft, or about 400 mD-ft to about 2600 mD-ft, or about 800 mD-ft to about 2200 mD-ft, or about 1200 mD-ft to about 1800 mD-ft, encompassing any value and subset therebetween. Each of these values is critical to the embodiments of the present disclosure and depend on a number of factors including, but not limited to, the operational conditions experienced by the proppant particulates (as defined below), the material of the proppant particulates, the size or the proppant particulates, other characteristics of the proppant particulates (e.g., shape and size), and the like, and any combination thereof.

As used herein, the term "operational conditions" refers to downhole conditions within a subterranean formation comprising a closure stress and a temperature. In general, the particulate operational conditions for determining the characteristics of the proppant particulates described herein are closure stresses of greater than about 1000 pounds per square inch (psi) and temperatures of greater than about 50° F., where 1 psi is equivalent to 6894.76 Pascals and 50° F. is equivalent to 10° C.

The measurements described herein for evaluating the characteristics of the proppant particulates are at operational conditions as defined above, unless expressly stated otherwise. The closure stress of the operational conditions is greater than about 1000 psi, or, in some embodiments, in the range of about 1000 psi to about 30000 psi, encompassing any value and subset therebetween. For example, the closure stress of the operational conditions may be from about 1000 psi to about 5000 psi, or about 5000 psi to about 10000 psi, or about 10000 psi to about 15000 psi, or about 15000 psi to about 20000 psi, or about 20000 psi to about 25000 psi, or about 25000 psi to about 30000 psi, or about 2000 psi to about 28000 psi, or about 4000 psi to about 26000 psi, or about 6000 psi to about 24000 psi, or about 8000 psi to about 20000 psi, or about 10000 psi to about 18000 psi, or about 12000 psi to about 16000 psi, encompassing any value and subset therebetween. The temperature of the operational conditions is greater than about 50° F., or, in some embodiments, in the range of about 50° F. to about 600° F., encompassing any value and subset therebetween. For example, the temperature of the operational conditions may be from about 50° F. to about 100° F., or about 100° F. to about 200° F., or about 200° F. to about 300° F., or about 300° F. to about 400° F., or about 400° F. to about 500° F., or about 500° F. to about 600° F., or about 100° F. to about 550° F., or about 150° F. to about 500° F., or about 200° F. to about 450° F., or about 250° F. to about 400° F., or about 300° F. to about 350° F., encompassing any value and subset therebetween. Each of the closure stress and temperature values above for the operational conditions is critical to the embodiments and depend on a number of factors including, but not limited to, the type of subterranean formation, the geographic location of the subterranean formation, and the like, and any combination thereof.

In some embodiments, a conductivity test performed according to API RP19D may be adapted such that one or more channels (i.e., solids-free or substantially solids-free channel, as described above) is formed in the testing cell between adjacent proppant "pillars," which may simply be proppant particulates packed together in the absence of a binding agent, or may be proppant particulates forming proppant aggregates in the presence of a binding agent. Accordingly, the term "proppant pillars" or simply "pillars" encompasses both packed forms of the proppant particulates described herein. When such channel(s) are formed in the testing cell, the channels are designed such that the proppant pillars occupy in the range of about 1% to about 99% of the available cross-sectional area of the testing cell, encompassing any value and subset therebetween. For example, the proppant pillars may occupy about 1% to about 15%, or about 15% to about 29%, or about 29% to about 43%, or about 43% to about 57%, or about 57% to about 71%, or about 71% to about 85%, or about 85% to about 99%, or about 10% to about 90%, or about 20% to about 80%, or about 30% to about 70%, or about 40% to about 60%, encompassing any value and subset therebetween. Each of these values is critical to the embodiments of the present disclosure and depend on a number of factors including, but not limited to, the operational conditions of the subterranean formation, the crush resistance of the proppant particulates, other characteristics of the proppant particulates as described herein (e.g., material, size, shape, etc.), and the like and any combination thereof.

Accordingly, the API RP19D testing cell is typically filled 100% with proppant particulates and/or proppant particulates and a binding agent forming proppant aggregates. However, a channel may occupy as little as about 1% of the cross-sectional space of the testing cell (and up to about 99%) to measure conductivity of the proppant particulates. Regardless of the presence or absence of a channel, however, the conductivity of the packed proppant particulates of the present disclosure is the conductivity through those packed particulates, and does not take into account the conductivity of an entire testing cell having channels therein. Accordingly, as shown in the Examples below, the conductivity of a testing cell having channels will be greater, and in some instances significantly greater depending on the size of the channels, as compared to the conductivity of the packed particulates therein. This is a novel aspect of the present disclosure, as it demonstrates the ability to use "subpar" proppant particulates to form proppant aggregates without compromising conductivity of a propped fracture.

It is to be understood that the closure stress operational conditions may be experienced directly by the packed proppant particulates within an API RP19D testing cell when there are no channels present. However, as channels are placed within the testing cell, and the operational conditions are applied to the API RP19D testing cell, the stress experienced by the packed particulates is increased, as the channel(s) does not absorb the closure stress. For example, the closure stress applied to the testing cell is the operational conditions, but the stress experienced by the packed particulates is up to about 400% greater than the closure stress of the operational conditions, such as up to about 2000000 psi. This too is another novel aspect of the present disclosure, as the use of "subpar" particulates to form the proppant aggregates used herein is still capable of withstanding the increased closure stress without compromising the integrity of a propped fracture.

In some embodiments, the stress experienced by the packed particulates where a channel is present is, for example, greater than the range of operational conditions disclosed herein, such as in the range of about 21000 psi to about 2000000 psi, encompassing any value and subset therebetween. For example, the stress experienced by the packed particulates where a channel is present may be from about 2100 psi to about 10000 psi, or about 10000 psi to about 100000 psi, or about 100000 psi to about 250000 psi, or about 250000 psi to about 500000 psi, or about 500000 psi to about 750000 psi, or about 750000 psi to about 1000000 psi, or about 1000000 psi to about 1250000 psi, or about 1250000 psi to about 1500000 psi, or about 1500000 psi to about 1750000 psi, or about 1750000 psi to about 2000000 psi, encompassing any value and subset therebetween. Each of these values is critical to the embodiments of the present disclosure and depend on a number of factors including, but not limited to, the size of the channel(s), the size of the packed particulates, and the like, and any combination thereof.

In some embodiments, any or all of the tests described herein and measured using API RP19D or API19C, described below, is performed in the presence of a liquid, which can be used to simulate a treatment fluid within a fracture subjected to operational closures. In such instances, the increased stress experienced by the packed particulates in the presence of a channel may be reduced as compared to the channels having only air present or in a vacuum as the fluid absorbs some of the stress.

In some embodiments, the conductivity of the proppant particulates described herein without a channel in the API RP19D testing cell, whether (in the presence of) or whether not (in the absence of) a binding agent, is less than 50%, to a lower limit of 0.5%, of the conductivity of the proppant particulates measured in the presence of at least one channel in the API RP19D testing cell, as described above. Accordingly, in some embodiments, the conductivity of the proppant particulates described herein without a channel in the API RP19D testing cell, whether (in the presence of) or whether not (in the absence of) a binding agent, is less than about 50%, or less than about 45%, or less than about 40%, or less than about 35%, or less than about 30%, or less than about 25%, or less than about 20%, or less than about 15%, or less than about 10%, or less than about 5%, or less than about 1%, or 0.5% less than the conductivity of the proppant particulates measured in the presence of at least one channel in the API RP19D testing cell, as described above, encompassing any value and subset therebetween. Each of these values is critical to the embodiments of the present disclosure and depend on a number of factors including, but not limited to, the size of the channel, the number of channels, the operational conditions, the other characteristics of the proppant particulates as described herein, and the like, and any combination thereof.

The proppant particulates selected for forming the proppant aggregates of the present disclosure exhibit a crush resistance as measured by API RP19C ($1^{st}$ ed., May 2008), referenced above, of greater than about 10% fines when exposed to operational conditions in the presence or absence of a channel. As used herein, the term "crush resistance" refers to a measure of the amount of fines formed upon application of a stress (e.g., simulated or actual closure stress), thus translating into a measure of the reduction in size of the proppant particulates due to the stress. As used herein, the term "fines" refers to portions of proppant particulate material that has separated from the original particulate due to the application of a stress (e.g., simulated or actual closure stress), and in some instances the stress in the presence of a particular temperature (e.g., simulated or actual downhole temperature).

The decreased crush resistance of the proppant particulates described herein is wholly opposite to the desired crush resistance of traditional proppant particulates (and ISO 13503) as described above. The formation of fines by individual proppant particulates forming a proppant aggregate is surprisingly desirable as the created fines wedge or otherwise take up space between individual proppant particulates, thus increasing the strength of the proppant aggregate as a whole and allowing the proppant aggregate to absorb stress more effectively. Because the proppant aggregates rely largely, and in some instances wholly, on the conductivity of channels, that the crushed fines occupy such interstitial spaces is of no import to the embodiments described herein, as discussed previously with reference to conductivity. Of course, it may be desirable to additionally have conductivity or porosity within the proppant aggregates, without departing from the scope of the present disclosure, to further enhance the flow of produced fluids from the formation.

As discussed above, the proppant particulates exhibit a crush resistance of greater than about 10% fines when exposed to particulate operational conditions as measured by API RP19C in the presence or absence of a channel, including up to an upper limit of 100% fines. Accordingly, in some embodiments, the proppant particulates exhibit a crush resistance of greater than about 10% fines, or greater than about 15% fines, or greater than about 20% fines, or greater than about 30% fines, or greater than about 35% fines, or greater than about 40% fines, or greater than about 50% fines, or greater than about 55% fines, or greater than about 60% fines, or greater than about 70% fines, or greater than about 75% fines, or greater than about 80% fines, or greater than about 85% fines, or greater than about 90% fines, or greater than about 95% fines, or greater than about 99% fines, or 100% fines when exposed to operational conditions as measured by API RP19C, encompassing any value and subset therebetween. Each of these values is critical to the embodiments of the present disclosure and depend on a number of factors including, but not limited to, the desired crush resistance, the operational conditions, the various characteristics of the proppant particulates as described herein, and the like, and any combination thereof. Indeed, the ability to use particulates that exhibit a crush resistance of greater than 10% fines, including up to 100% fines, is wholly contrary to traditional proppant particulates.

The size of the proppant particulates can be used to further enhance the performance of the proppant aggregates of the present disclosure. For example, single sizes or combination of sizes may be used to manipulate the characteristics of the proppant aggregates (e.g., mechanical strength, closure stress resistance, deformation, and the like). In some embodiments, the proppant particulates of the present disclosure have a mean unit mesh particle size of less than about 3000 micrometers (μm) when exposed to operational conditions. As used herein, the term "mean" with reference to unit mesh particle size refers to a calculated average size. As used herein, the term "unit mesh particle size" or simply "unit mesh size" refers to a size of an object (e.g., a proppant particulate) that is able to pass through a square area having each side thereof equal to a specified numerical value (e.g., less than about 300 μm). An example of unit mesh particle size is the American Society for Testing and Materials (ASTM) Designation: E11. In other embodiments, the proppant particulates have a mean unit mesh size of less than about 3000 μm prior to exposure to the operational conditions, such that they have at least not been exposed to closure stress or such that they have not been exposed to either closure stress or operational condition temperatures, encompassing any value and subset therebetween. In yet other embodiments, the proppant particulates have a mean unit mesh size of less than about 3000 μm upon exposure to cyclic stress, encompassing any value and subset therebetween. As used herein, the term "cyclic stress" refers to cyclic changes in closure stress after the closure stress has been exerted. Cyclic stress can result in changes in the closure stress such as due to shut-ins, workovers, connections to pipelines, and the like.

In some embodiments, the proppant particulates have a mean unit mesh particle size of about 1 μm to about 3000 μm before or after exposure to operational conditions and any cyclic stress, encompassing any value and subset therebetween. For example, the proppant particulates may have a mean unit mesh particle size of about 1 μm to about 50 μm, or about 50 μm to about 100 μm, or about 100 μm to about 200 μm, or about 200 μm to about 760 μm, or about 760 μm to about 1320 μm, or about 1320 μm to about 1880 μm, or about 1880 μm to about 2440 μm, or about 2440 μm to about 3000 μm, or about 600 μm to about 2500 μm, or about 1100 μm to about 2000 μm before or after exposure to operational conditions or any cyclic stress, encompassing any value and subset therebetween. Each of these values is critical to the embodiments of the present disclosure and depends on a number of factors including, but not limited to, the crush resistance of the proppant particulates, the operational conditions, whether the proppant particulates have been exposed to the operational conditions, whether the proppant particulates have been exposed to cyclic stress, the size distribution of the proppant particulates as described below, the other characteristics of the proppant particulates as described herein, and the like, and any combination thereof.

In some embodiments, the proppant particulates described herein have particular "particle size distributions" (PSD), defined as a percentage of the proppant particulates that fall into a certain unit mesh size range. The percentage is represented as $D_X$, where X is the percentage. For example, $D_{50}$ represents the mean unit mesh particle size of the proppant particulates, as described above, which is the value of the unit mesh particle size at 50% in the cumulative PSD. As another example, $D_{95}$ is the unit mesh particle size value where 95% of the proppant particulates are smaller than such value, and $D_5$ is the unit mesh particle size value where 5% of the proppant particulates are smaller than such value. In other embodiments, the proppant particulates described herein have a particular "particle size distribution width" (PSD width), defined as the difference between the $D_{95}$ and the $D_5$ unit mesh particle size value.

In some embodiments, the proppant particulates have a PSD such that the $D_{95}$ and the $D_5$ both have a unit mesh particle size value in the range of about 1 μm to about 3000 μm when exposed to operational conditions, encompassing any value and subset therebetween. In other embodiments, the proppant particulates have a PSD such that the $D_{95}$ and the $D_5$ both have a unit mesh particle size value in the range of about 1 μm to about 3000 μm prior to exposure to the operational conditions, or such that they have not been exposed to either closure stress or operational condition temperatures, encompassing any value and subset therebetween. In still other embodiments, the proppant particulates have a PSD such that the $D_{95}$ and the $D_5$ both have a unit mesh particle size value in the range of about 1 μm to about 3000 μm upon exposure to cyclic stress, encompassing any value and subset therebetween.

For example, the proppant particulates may have PSD such that the $D_{95}$ and the $D_5$ both have a unit mesh particle size value of about 1 μm to about 50 μm, or about 50 μm to about 100 μm, or about 100 μm to about 200 μm, or about 200 μm to about 760 μm, or about 760 μm to about 1320 μm, or about 1320 μm to about 1880 μm, or about 1880 μm to about 2440 μm, or about 2440 μm to about 3000 μm, or about 600 μm to about 2500 μm, or about 1100 μm to about 2000 μm before or after exposure to operational conditions or any cyclic stress, encompassing any value and subset therebetween. Each of these values is critical to the embodiments of the present disclosure and depends on a number of factors including, but not limited to, the crush resistance of the proppant particulates, the operational conditions, whether the proppant particulates have been exposed to the operational conditions, whether the proppant particulates have been exposed to cyclic stress, the size distribution of the proppant particulates as described below, the other characteristics of the proppant particulates as described herein, and the like, and any combination thereof.

The PSD of the proppant particulates used to form the proppant aggregates of the present disclosure may be such that two primary regions exist and an intermediate region exists between the primary regions. In such embodiments, the PSD regions each consist of a quantity (and size as described above) of proppant particulates, where the quantity of proppant particulates in the intermediate region is less than the average (or mean) quantity of the proppant particulates in the two combined primary regions. In some embodiments, the quantity of proppant particulates in the intermediate region is less than about 50% of the average quantity of the two combined primary regions. In other embodiments, the quantity of proppant particulates in the intermediate region is in the range of about 5% to about 50% of the average quantity of the two combined primary regions, encompassing any value and subset therebetween. For example, the quantity of proppant particulates in the intermediate region may be about 5% to about 10%, or about 10% to about 20%, or about 20% to about 30%, or about 30% to about 40%, or about 40% to about 50%, or about 5% to about 45%, or about 10% to about 40%, or about 15% to about 35%, or about 20% to about 30% of the average quantity of the two combined primary regions, encompassing any value and subset therebetween, encompassing any value and subset therebetween. Each of these values is critical to the embodiments of the present disclosure and depends on a number of factors including, but not limited to, the desired interstitial spaces between adjacent proppant particulates, the characteristics of the proppant particulates as described herein, the operational conditions, and the like, and any combination thereof.

In some embodiments, the proppant particulates used to form the proppant aggregates described herein have a PSD width of greater than a unit mesh particle size of about 50 μm when exposed to operational conditions. In other embodiments, the proppant particulates have a PSD width of greater than a unit mesh particle size of about 50 μm prior to exposure to the operational conditions, or such that they have not been exposed to either closure stress or operational condition temperatures, encompassing any value and subset therebetween. In yet other embodiments, the proppant particulates have a PSD width of greater than a unit mesh particle size of about 50 μm when exposed to cyclic stress.

In some embodiments, the proppant particulates have a PSD width of a unit mesh particle size of from about 50 μm to about 2000 μm before or after exposure to operational conditions or any cyclic stress, encompassing any value and subset therebetween. For example, the proppant particulates may have a PSD width of a unit mesh particle size of about 50 μm to about 200 μm, or about 200 μm to about 400 μm, or about 400 μm to about 600 μm, or about 600 μm to about 800 μm, or about 800 μm to about 1000 μm, or about 1000 μm to about 1200 μm, or about 1200 μm to about 1400 μm, or about 1400 μm to about 1600 μm, or about 1600 μm to about 1800 μm, or about 1800 μm to about 2000 μm, or about 200 μm to about 1800 μm, or about 400 μm to about 1600 μm, or about 600 μm to about 1400 μm, or about 800 μm to about 1200 μm before or after exposure to operational conditions or any cyclic stress, encompassing any value and subset therebetween. Each of these values is critical to the embodiments of the present disclosure and depends on a number of factors including, but not limited to, the crush resistance of the proppant particulates, the operational conditions, whether the proppant particulates have been exposed to the operational conditions, whether the proppant particulates have been exposed to cyclic stress, the size distribution of the proppant particulates as described below, the other characteristics of the proppant particulates as described herein, and the like, and any combination thereof.

Each of the above proppant particulate mean unit mesh particle size(s), PSD(s), and PSD width(s) may be before or after exposure to the binding agent for forming the proppant aggregates described herein, without departing from the scope of the present disclosure. The presence of the binding agent may increase the size of individual proppant particulates (e.g., by wholly or partially coating a layer thereon), whereas exposure to one or both operational conditions of closure stress or closure stress and downhole temperature or exposure to cyclic stress changes in closure stress can each cause the size of the proppant particulates to decrease (e.g., by crushing or deforming). Moreover, abrasion and other stresses, such as those encountered during pumping the proppant particulates to a downhole location may result in a reduction in size.

Accordingly, upon exposure to the operational condition(s), cyclic stress, and/or pumping stresses, the proppant particulates may dramatically change in unit mesh particle size, such that their mean unit mesh particle size (or $D_{50}$) is reduced by greater than about 5% per hour upon being introduced into a subterranean formation compared to prior to their introduction. In some embodiments, upon exposure to the operational condition(s), cyclic stress, and/or pumping stresses, the proppant particulates may change in unit mesh particle size, such that their mean unit mesh particle size (or $D_{50}$) is reduced by about 5% to about 50% per hour upon being introduced into a subterranean formation as compared to prior to their introduction, encompassing any value and subset therebetween. For example, the unit mesh particle size may be reduced by 5% to about 10%, or about 10% to about 20%, or about 20% to about 30%, or about 30% to about 40%, or about 40% to about 50%, or about 5% to about 45%, or about 10% to about 40%, or about 15% to about 35%, or about 20% to about 30% per hour upon being introduced into a subterranean formation as compared to prior to their introduction upon exposure to the operational condition(s), cyclic stress, and/or pumping stresses, the proppant particulates may change in unit mesh particle size, encompassing any value and subset therebetween. Each of these values is critical to the embodiments of the present disclosure and depend on a number of factors including, but not limited to, the stresses encountered by the proppant particulates (e.g., operational conditions, pumping stress, cyclic stress), the crush resistance of the proppant particulates, the other characteristics of the proppant particulates as described herein, and the like, and any combination thereof. Despite this proppant particulate size reduction, the proppant aggregates formed from the proppant particulates remain sufficiently able to prop open fractures at operational conditions, at least due to the particular characteristics of the proppant particulates described herein.

The individual proppant particulates of the present disclosure when packed together in the absence of the binding agent exhibit a porosity, which is altered at least partially upon application or exposure to the binding agent. As used herein, the term "porosity" refers to an amount or volume of void space of a packed proppant particulates (either in the absence or presence of the binding agent) that can contain a fluid. The presence of the binding agent generally decreases the porosity of the packed proppant particulates in the absence of the binding agent, as it coats into pore spaces on at least the surface of the proppant particulates.

In some embodiments, the porosity of the packed together proppant particulates in the absence of the binding agent exhibit a porosity of less than about 45% when exposed to operational conditions. In other embodiments, the porosity of the packed together proppant particulates is less than about 45% prior to exposure to the operational conditions, or such that they have not been exposed to either closure stress or operational condition temperatures, encompassing any value and subset therebetween. In still other embodiments, the porosity of the packed together proppant particulates is less than about 45% when exposed to cyclic stress. It will be appreciated that the influence of such condition(s) and/or cyclic stress will have similar effects upon the porosity of the packed proppant particulates as discussed above with reference to the crush resistance and size of the proppant particulates.

As described above, the packed together proppant particulates in the absence of the binding agent exhibit a porosity of less than about 45%, with a lower limit of 0% before or after exposure to operational conditions or any cyclic stress. Accordingly, in some embodiments, the packed together proppant particulates in the absence of the binding agent have a porosity of less than about 45%, or less than about 40%, or less than about 35%, or less than about 30%, or less than about 25%, or less than about 20%, or less than about 15%, or less than about 10%, or less than about 5%, or less than about 1%, or 0% before or after exposure to operational conditions or any cyclic stress, encompassing any value and subset therebetween. Each of these values is critical to the embodiments of the present disclosure and depend on a number of factors including, but not limited to, the size (including PSD and/or PSD width) of the proppant particulates, the material forming the proppant particulates, the operational conditions, whether the proppant particulates have been exposed to the operational conditions, whether the proppant particulates have been exposed to cyclic stress, below, the other characteristics of the proppant particulates as described herein, and the like, and any combination thereof.

Similar to the other characteristics described herein, the sphericity and roundness of the proppant particulates for forming the proppant aggregates of the present disclosure is opposite to that of ISO 13503. Indeed, the sphericity and roundness of the proppant aggregates may be such that they depart from the shape of a sphere and have relatively shape curvatures. As used herein, the term "sphericity" is a measure of how close a proppant particulate approaches the shape of a sphere and the term "roundness" is a measure of the relative sharpness of corners or of curvature. Each are measured according to API RP19C ($1^{st}$ ed., May 2008), as referenced above, using the Krumbien Scale. The proppant particulates of the present disclosure have a sphericity and roundness of less than about 0.9 prior to the application of the binding agent and prior to application of operational conditions, or such that they have not been exposed to either closure stress or operational condition temperatures. This characteristic of the present disclosure allows a wider range of particulates to be selected as the proppant particulates, thus increasing availability and decreasing costs.

As described above, the proppant particulates for forming the proppant aggregates of the present disclosure have a sphericity and roundness as measured by API RP19C of less than about 0.9, including a lower limit of 0. Accordingly, in some embodiments, the proppant particulates have a sphericity and roundness as measured by API RP19C of less than about 0.9, or less than about 0.8, or less than about 0.7, or less than about 0.6, or less than about 0.5, or less than about 0.5, or less than about 0.4, or less than about 0.3, or less than about 0.2, or less than about 0.1, or 0, encompassing any value and subset therebetween. Each of these values is critical to the embodiments of the present disclosure and depend on a number of factors including, but not limited to, the type of proppant particulates selected, the operational conditions to be encountered, the crush resistance of the proppant particulates, the other characteristics of the proppant particulates as described herein, and the like, and any combination thereof.

In other embodiments, at least two categories of proppant particulates in terms of sphericity and roundness are selected for forming the proppant aggregates described herein, such that the first category has a sphericity and roundness as measured by API RP19C prior to application of the binding agent of less than about 0.9 (and any range described above) and the second category has a sphericity and roundness as measured by API RP19C prior to application of the binding agent that differs by at least 0.1 compared to the first category.

When the proppant particulates are coated with a binding agent, their roundness and sphericity is altered due to the whole or partial coating of the binding agent about the outer surface of the proppant particulates. The proppant particulates, upon application (coating) of the binding agent experience an increase in roundness and/or sphericity of about 0.1 or greater. For example, the proppant particulates may have a roundness of 0.5 and upon application of the binding agent, the roundness is increased to about 0.6, about 0.7, about 0.8, or about 0.9. Similarly, the proppant particulates may have a sphericity of 0.8 and upon application of the binding agent, the sphericity is increased to about 0.9. It is to be understood that the roundness and sphericity may increase identically (i.e., by the same amount) upon application of the binding agent or differently (e.g., one increases by more) upon application of the binding agent, without departing from the scope of the present disclosure.

As previously described, the embodiments of the present disclosure permit the use of previously deemed "subpar" particulates for proppant, thus enabling consumption (including local consumption) of a wide variety of low cost materials for use in generating a highly conductive fracture that have heretofore been dismissed for use in fracturing operations. Examples of materials for use as the proppant particulates of the present disclosure include any material capable of meeting one or more of the characteristics described herein for use in a fracturing operation. Such material include sand, bauxite, ceramic materials, glass materials, polymer materials (e.g., polystyrene, polyethylene, etc.), nut shell pieces, seed shell pieces, fruit pit pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufacture materials, any of the aforementioned mixed with a resin to form cured resinous particulates, and any combination thereof. It is to be understood that although such materials have been used as proppant particulates in the past, they have not met the required one or more characteristics of the proppant particulates of the present disclosure. For example, the mechanical strength of the same material will differ depending on whether the proppant particulates are more or less porous compared to one another, which will influence crush resistance, as well.

In some embodiments, local sand is a preferred material for forming the proppant particulates of the present disclosure. As used herein, the term "local sand" refers to locally available solid material that originates from surface sources, or from subsurface sources such as mine. Local sand may be preferred, as it is readily obtainable and is typically inexpensive because it is not traditionally used as proppant particulates in fracturing operations. Examples of commercially available local sand include, but are not limited to, sand available from Adwan Chemical Industries Co. Ltd. in Saudi Arabia, and sand available from Delmon Co. Ltd. in Saudi Arabia. Other commercially available types of sand including, but not limited, to Brady Brown sand and Northern White sand types.

Table 1 below demonstrates the difference in various characteristics as measured using API RP19C of the commercially available local sand as compared to traditional ISO 13503 commercially available proppant particulates and Table 2 indicates the crush resistance as measured by API RP19C of the commercially available local sand as compared to traditional ISO 13503 commercially available proppant particulates. The traditional ISO 13503 commercially available proppant particulates are CARBOHSP high-density sintered bauxite proppant available from CARBO Ceramics Inc. in Houston, Tex. Of particular interest in Table 1 is the vast difference in roundness, sphericity, and in Table 2 of the vast difference in high psi fines generation in crush resistance testing. The sand numbers (e.g., 20/40, 16/30, 30/50, 30/60) indicate low and high sieve values based on U.S. Standard Sieve Series. The units "gm/cc" are grams per milliliter, "FTU" is the Fomazin Turbiditiy Unit. Table 2 lists the % of fines generated upon application of a particular closure stress. Where the symbol "--" is shown, the API RP19C measurement is not provided.

TABLE 1

| Particulate Type | Specific Gravity | Bulk Density (gm/cc) | Acid Solubility (%) | Turbiditiy (FTU) | Sphericity | Roundness |
|---|---|---|---|---|---|---|
| Adwan 20/40 sand | 2.64 | — | 3.76 | 65 | 0.64 | 0.7 |
| Delmon 20/40 sand | 2.63 | 1.53 | 0.55 | 20 | 0.72 | 0.71 |
| Northern White 20/40 sand | 2.65 | 1.53 | 0.6-0.7 | 45-70 | 0.7-0.9 | 0.7-0.9 |
| Brown 20/40 sand | 2.65 | 1.54 | 0.9 | 48 | 0.64 | 0.62 |
| Adwan 16/30 sand | — | 1.58 | 2.22 | 10 | 0.77 | 0.66 |
| Delmon 16/30 sand | — | 1.6 | 1.11 | 15 | 0.73 | 0.6 |
| Delmon 30/50 sand | — | 1.51 | 0.55 | 21 | 0.65 | 0.68 |
| CARBOHSP 30/60 proppant | 3.61 | 2.1 | 2.5 | — | 0.9 | 0.9 |

TABLE 2

| | Crush (1000 psi) | Crush (2000 psi) | Crush (3000 psi) | Crush (4000 psi) | Crush (5000 psi) | Crush (6000 psi) |
|---|---|---|---|---|---|---|
| Adwan 20/40 sand | — | 1.3% | — | 10.5% | — | 24.5% |
| Delmon 20/40 sand | 0.3% | 1.3% | 5.4% | 17.1% | — | — |
| Northern White 20/40 sand | — | 0.7% | — | 1.6% | 2.6% | — |
| Brown 20/40 sand | — | 0.7% | 2.0% | 6.7% | — | — |
| Adwan 16/30 sand | — | 3.3% | — | 22.9% | — | 37.0% |
| Delmon 16/30 sand | — | 4.7% | — | 26.1% | — | 39.4% |
| Delmon 30/50 sand | 0.5% | 1.2% | 3.6% | 6.7% | 15.7% | — |
| CARBOHSP 30/60 proppant | — | — | — | — | — | 0.1% |

The embodiments herein provide a method of introducing the proppant aggregates of the present disclosure to a downhole location. In particular, the proppant aggregates are introduced into a subterranean formation and placed into at least one fracture in the subterranean formation, followed by removing hydraulic pressure from the formation to expose the proppant aggregates to operational conditions, as defined above. The proppant aggregates comprise proppant particulates and a binding agent and may be formed on-the-fly by combining the proppant particulates and the binding agent as they are introduced into the formation. As used herein, the term "on-the-fly" refers to performing an operation during a subterranean treatment that does not require stopping normal operations. The proppant aggregates may be introduced into the subterranean formation in a treatment fluid comprising a base fluid, which may be an aqueous base fluid, an oil base fluid, an aqueous-miscible (i.e., having an alcohol) base fluid, an oil-in-water emulsion, or a water-in-oil emulsion.

Moreover, the treatment fluid may additionally comprise one or more additives for enhancing the fracturing operation, enhancing the treatment fluid itself, enhancing the ability of the proppant aggregates to form or remain in suspension, and the like. Examples of suitable additives may include, but are not limited to, a salt, a weighting agent, an inert solid, an emulsifier, a dispersion aid, a corrosion inhibitor, an emulsion thinner, an emulsion thickener, a surfactant, a lost circulation material, a foaming agent, a gas, a pH control additive, a breaker, a biocide, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids comprising proppant aggregates described herein to a downhole location are described, such as during a hydraulic fracturing operation. In various embodiments, the systems can comprise a pump fluidly coupled to a tubular, the tubular containing a treatment fluid comprising the proppant aggregates, referred to below simply as "treatment fluid."

The pump may be a high-pressure pump in some embodiments. As used herein, the term "high pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some embodiments, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps.

In other embodiments, the pump may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of the treatment fluid before it reaches the high-pressure pump.

In some embodiments, the systems described herein can further comprise a mixing tank that is upstream of the pump and in which the treatment fluid is formulated. In various embodiments, the pump (e.g., a low-pressure pump, a high-pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may be recovered and used in a different subterranean formation, a different operation, or a different industrial application.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A proppant aggregate comprising: proppant particulates and a binding agent, wherein the proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 50° F.

Embodiment B

A method comprising: introducing proppant aggregates into a subterranean formation, the proppant aggregates comprising proppant particulates and a binding agent, wherein the proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 50° F.; placing the proppant aggregates into at least one fracture in a subterranean formation; and removing hydraulic pressure from the subterranean formation, thereby exposing the proppant aggregates to the operational conditions in the fracture.

Embodiment C

A system comprising: a tubular extending into a subterranean formation and fluidly coupled to a pump, the tubular containing proppant aggregates comprising proppant particulates and a binding agent, wherein the proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 50° F.

Each of Embodiments A, B, and C may have one or more of the following additional elements in any combination:

Element 1: Wherein the proppant particulates have a crush resistance of greater than about 10% fines when exposed to the operational conditions.

Element 2: Wherein the proppant particulates have a mean unit mesh particle size of less than about 3000 micrometers when exposed to the operational conditions.

Element 3: Wherein the proppant particulates have a mean unit mesh particle size of less than about 3000 micrometers prior to exposure to the operational conditions, such that the proppant particulates at least have not experienced the closure stress.

Element 4: Wherein the proppant particulates in the absence of the binding agent pack together to exhibit a porosity of less than about 45% when exposed to the operational conditions.

Element 5: Wherein the proppant particulates in the absence of the binding agent pack together to exhibit a porosity of less than about 45% prior to exposure to the operational conditions, such that the proppant particulates at least have not experienced the closure stress.

Element 6: Wherein the proppant particulates have a sphericity and a roundness of less than about 0.9.

Element 7: Wherein (1) the proppant particulates have a crush resistance of greater than about 10% fines when exposed to the operational conditions, (2) wherein the proppant particulates have a mean unit mesh particle size of less than about 3000 micrometers when exposed to the operational conditions, (3) wherein the proppant particulates in the absence of the binding agent pack together to exhibit a porosity of less than about 45% when exposed to the operational conditions, and (4) wherein the proppant particulates have a sphericity and roundness of less than about 0.9.

Element 8: Wherein (1) the proppant particulates have a crush resistance of greater than about 10% fines when exposed to the operational conditions, (2) the proppant particulates have a mean unit mesh particle size of less than about 3000 micrometers prior to exposure to the operational conditions, such that the proppant particulates at least have not experienced the closure stress, (3) the proppant particulates in the absence of the binding agent pack together to exhibit a porosity of less than about 45% prior to exposure to the operational conditions, such that the proppant particulates at least have not experienced the closure stress, and (4) wherein the proppant particulates have a sphericity and roundness of less than about 0.9.

By way of non-limiting example, exemplary combinations applicable to A, B, C include: 1, 2, 3, 4, 5, 6, 7, and 8; 1 and 2; 5, 6, 7, and 10; 3, 4, and 6; 4 and 8; 2 and 6; 1, 3, and 7; and the like.

To facilitate a better understanding of the embodiments described herein, the following example of preferred or representative embodiments is given. In no way should the following example be read to limit, or to define, the scope of the present disclosure.

Example 1

In this example, the conductivity of a proppant aggregate formed using the proppant particulates of the present disclosure (Adwan 20/40 sand) was evaluated according to API RP19D (1$^{st}$ ed., May 2008), as referenced above, in which the testing cell included either no channel or a channel. The proppant aggregates were formed with 11 grams (g) of the sand coated with 5% vol/wt EXPEDITE®, and the conductivity test was performed at a flow rate of 2 milliliters per minute (cc/min). Tables 3 and 4 show the conductivity results of two duplicate testing cells without (w/o) a channel present therein, whereas Table 5 shows conductivity results in which the testing cell included a channel.

TABLE 3

| | Adwan sand 20/40 Sand w/o Channel in Testing Chamber | | | | |
|---|---|---|---|---|---|
| | Closure stress (2000 psi) | Closure stress (4000 psi) | Closure stress (6000 psi) | Closure stress (8000 psi) | Closure stress (10000 psi) |
| Conductivity (mD-ft) | 2115 | 1062 | 865 | 821 | 863 |

TABLE 4

Adwan sand 20/40 Sand w/o Channel in Testing Chamber

|  | Closure stress (2000 psi) | Closure stress (4000 psi) | Closure stress (6000 psi) | Closure stress (8000 psi) | Closure stress (10000 psi) |
|---|---|---|---|---|---|
| Conductivity (mD-ft) | 2316 | 1117 | 1068 | 1005 | 1003 |

TABLE 5

Adwan sand 20/40 Sand with Channel in Testing Chamber

|  | Closure stress (2000 psi) | Closure stress (4000 psi) | Closure stress (6000 psi) | Closure stress (8000 psi) | Closure stress (10000 psi) |
|---|---|---|---|---|---|
| Conductivity (mD-ft) | 7252 | 3539 | 2185 | 4655 | 3877 |

As shown, Tables 3 and 4 without a channel present the Adwan 20/40 proppant particulates show a conductivity of less than about the highest value of 2316 mD-ft at 2000 psi, which reduces as the closure stress increases. With reference to Table 2 above, the crush resistance of Adwan 20/40 at 4000 psi is 10.5%. Thus, Adwan 20/40 is a suitable proppant particulate for use in forming the proppant aggregates of the present disclosure at at least 4000 psi closure stress. Additionally, referring to Table 3 and Table 5, when a channel is formed, the conductivity at 4000 psi, the proppant pack conductivity is 30% of the conductivity with the channel.

Example 2

In this example, the conductivity of the proppant particulates of the present disclosure (Adwan 20/40 local sand) was compared to that of traditional proppant particulates (CARBOHSP 30/60 proppant) when each were formed into proppant aggregates using EXPEDITE® resin. Each proppant aggregate was tested according to API RP19D (1$^{st}$ ed., May 2008) at various flow rates and times with an applied force of 100,000 pounds (lbs), and having a channel included in the testing cell as described herein. The proppant aggregates formed using Adwan 20/40 local sand was formed with 11 grams (g) of the sand coated with 7% EXPEDITE®, and the proppant aggregates formed using CARBOHSP 30/60 proppant was formed with 11 g of the CARBOHSP 30/60 proppant coated with 3% volume by weight (vol/wt) EXPEDITE®. The results of the Adwan 20/40 local sand are shown in Tables 6-8 for various time points, and the results of the CARBOHSP 30/60 proppant are shown in Table 9-11 for various time points.

The "cell area" is the cross-sectional area of the testing cell that applies mechanical force onto the packed proppant particulates or proppant aggregate. For API 19D, this value is fixed at 10 inch$^2$, although alternative testing cell designs might use a higher or lower value. The "aggregate area" is the cross-sectional area of the testing cell that contains the packed proppant particulates (value equal to cell area) or the proppant aggregate (value less than the cell area). The "cell closure stress" is the mechanical load on the testing cell divided by the cell area to generate a closure stress (e.g., simulating the operational conditions). The "aggregate closure stress" is the mechanical load on the cell divided by the aggregate area to generate the stress on the proppant aggregate (which has an aggregate area value less than the cell area). The "bed height" is the measured space between the testing cell faces associated with fracture width in the measurement.

TABLE 6

Adwan 20/40 sand Results at Time 0 Hours and 100,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 9739 | 9739 | 9739 |
| Aggregate Closure Stress (psi) | 37313 | 37313 | 37313 |
| Bed Height (inch) | 0.074 | 0.074 | 0.074 |
| Conductivity (mD-ft) | 75561 | 87183 | 102972 |
| Permeability (darcies) | 12253 | 14138 | 16698 |

TABLE 7

Adwan 20/40 sand Results at Time 24 Hours and 100,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 10034 | 10034 | 10034 |
| Aggregate Closure Stress (psi) | 37313 | 37313 | 37313 |
| Bed Height (inch) | 0.07 | 0.07 | 0.07 |
| Conductivity (mD-ft) | 60895 | 70738 | 84385 |
| Permeability (darcies) | 10439 | 12126 | 14466 |

TABLE 8

Adwan 20/40 sand Results at Time 48 Hours and 100,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 10535 | 10535 | 10535 |
| Aggregate Closure Stress (psi) | 37313 | 37313 | 37313 |
| Bed Height (inch) | 0.067 | 0.067 | 0.067 |
| Conductivity (mD-ft) | 20052 | 21571 | 22132 |
| Permeability (darcies) | 3591 | 3864 | 3964 |

TABLE 9

CARBOHSP 30/60 proppant Results at Time 0 Hours and 100,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 9708 | 9708 | 9708 |
| Aggregate Closure Stress (psi) | 37313 | 37313 | 37313 |
| Bed Height (inch) | 0.069 | 0.069 | 0.069 |

TABLE 9-continued

CARBOHSP 30/60 proppant Results at Time
0 Hours and 100,000 Pounds of Force

|  | Flow Rate at 100 (cc/min) | Flow Rate at 80 (cc/min) | Flow Rate at 60 (cc/min) |
|---|---|---|---|
| Conductivity (mD-ft) | 27483 | 30309 | 33000 |
| Permeability (darcies) | 4780 | 5271 | 5739 |

TABLE 10

CARBOHSP 30/60 proppant Results at Time
24 Hours and 100,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 10004 | 10004 | 10004 |
| Aggregate Closure Stress (psi) | 37313 | 37313 | 37313 |
| Bed Height (inch) | 0.066 | 0.066 | 0.066 |
| Conductivity (mD-ft) | 15561 | 18162 | 21359 |
| Permeability (darcies) | 2829 | 3302 | 3883 |

TABLE 11

CARBOHSP 30/60 proppant Results at Time
48 Hours and 100,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 10539 | 10539 | 10539 |
| Aggregate Closure Stress (psi) | 37313 | 37313 | 37313 |
| Bed Height (inch) | 0.063 | 0.063 | 0.063 |
| Conductivity (mD-ft) | 13589 | 14348 | 15384 |
| Permeability (darcies) | 2588 | 2733 | 2930 |

As shown, Tables 6-8 and Tables 9-11 indicate that aggregates of "subpar" proppant particulates can exhibit high conductivity when a channel exists in a standard API 19C conductivity testing cell. The CARBOHSP 30/60 proppant is comprised of high grade aluminum oxide and should perform well up to 15,000 psi as a conventional proppant pack. When formed into a proppant aggregate with a binding agent and a suitable channel exists, the channel conductivity of CARBOHSP 30/60 proppant aggregates is much higher than in conventional proppant pack. Adwan 20/40 is a lower quality particulate, which has more than 10% fines at 4,000 psi and lower proppant pack conductivity than CARBOHSP 30/60 proppant at the closure stress of 10,000 psi. The expected performance of Adwan 20/40 sand when formed into an aggregate with a binding agent and a suitable channel should be of lower performance than CARBOHSP 30/60 proppant similarly formed into an aggregate with a binding agent and a suitable channel. However, unexpectedly, the channel conductivity of a proppant aggregate of Adwan 20/40 sand exceeded the conductivity of a proppant aggregate of CARBOHSP 30/60 proppant. Tables 3-8 indicate that a channel exists because the cross sectional area of the aggregate is less than the cross sectional area of the cell. In addition, the stress on the proppant aggregates with "subpar" particulates is much higher than on a conventional proppant pack, as the aggregate area is less than the cell area. Adwan 20/40 sand particulates generate higher conductivity at a higher closure stress of 37,000 psi than CARBOHSP 30/60 proppant conductivity in a conventional proppant pack at 10,000 psi, which is 1850 mD-ft and also has a crush resistance of 0.6% fines (published by the manufacturer).

Example 3

In this example, the conductivity of the proppant particulates of the present disclosure (Adwan 20/40 sand) was compared to that of traditional proppant particulates (CARBOHSP 30/60 proppant) when each were formed into proppant aggregates using EXPEDITE® resin. Each proppant aggregate was tested according to API RP19D (1$^{st}$ ed., May 2008) at various flow rates and times with an applied force of 120,000 pounds (lbs), and having a channel included in the testing cell as described herein. The proppant aggregates formed using Adwan 20/40 sand was formed with 11 grams (g) of the sand coated with 7% EXPEDITE®, and the proppant aggregates formed using CARBOHSP 30/60 proppant was formed with 11 g of the CARBOHSP 30/60 coated with 3% vol/wt EXPEDITE®. The results of the Adwan 20/40 sand are shown in Tables 12-14 for various time points, and the results of the CARBOHSP 30/60 are shown in Table 15-17 for various time points.

TABLE 12

Adwan 20/40 sand Results at Time 24
Hours and 120,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 12007 | 12007 | 12007 |
| Aggregate Closure Stress (psi) | 44776 | 44776 | 44776 |
| Bed Height (inch) | 0.067 | 0.067 | 0.067 |
| Conductivity (mD-ft) | 10817 | 11735 | 12278 |
| Permeability (darcies) | 1937 | 21002 | 2199 |

TABLE 13

Adwan 20/40 sand Results at Time 48
hours and 120,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 12006 | 12006 | 12006 |
| Aggregate Closure Stress (psi) | 44706 | 44706 | 44706 |
| Bed Height (inch) | 0.06 | 0.06 | 0.06 |
| Conductivity (mD-ft) | 10099 | 10801 | 11498 |
| Permeability (darcies) | 2020 | 2160 | 2300 |

TABLE 14

Adwan 20/40 sand Results at Time 72 Hours and 120,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 12006 | 12006 | 12006 |
| Aggregate Closure Stress (psi) | 44776 | 44776 | 44776 |
| Bed Height (inch) | 0.058 | 0.058 | 0.058 |
| Conductivity (mD-ft) | 2957 | 3334 | 3835 |
| Permeability (darcies) | 611 | 691 | 793 |

TABLE 15

CARBOHSP 30/60 proppant Results at Time 24 Hours and 120,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 12005 | 12005 | 12005 |
| Aggregate Closure Stress (psi) | 44776 | 44776 | 44776 |
| Bed Height (inch) | 0.063 | 0.063 | 0.063 |
| Conductivity (mD-ft) | 7908 | 8705 | 10211 |
| Permeability (darcies) | 1506 | 1658 | 1945 |

TABLE 16

CARBOHSP 30/60 proppant Results at Time 48 Hours and 120,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 12008 | 12008 | 12008 |
| Aggregate Closure Stress (psi) | 44776 | 44776 | 44776 |
| Bed Height (inch) | 0.055 | 0.055 | 0.055 |
| Conductivity (mD-ft) | 6568 | 7353 | 8609 |
| Permeability (darcies) | 1433 | 1604 | 1878 |

TABLE 17

CARBOHSP proppant 30/60 Results at Time 72 Hours and 120,000 Pounds of Force

|  | Flow Rate at 100 (cc/min) | Flow Rate at 80 (cc/min) | Flow Rate at 60 (cc/min) |
|---|---|---|---|
| Cell Area (inch$^2$) | 10 | 10 | 10 |
| Aggregate area (inch$^2$) | 2.68 | 2.68 | 2.68 |
| Cell Closure Stress (psi) | 12003 | 12003 | 12003q |
| Aggregate Closure Stress (psi) | 44776 | 44776 | 44776 |
| Bed Height (inch) | 0.054 | 0.054 | 0.054 |
| Conductivity (mD-ft) | 2123 | 2369 | 2734 |
| Permeability (darcies) | 472 | 526 | 607 |

As shown, Tables 12-14 and Tables 15-17 indicate that proppant aggregates of "subpar" particulates exhibit high conductivity when a channel exists in a standard API 19C conductivity testing cell. The CARBOHSP 30/60 proppant is comprised of high grade aluminum oxide and should perform well up to 15,000 psi as a conventional proppant pack. When formed into a proppant aggregate with a binding agent and a suitable channel exists, the channel conductivity of CARBOHSP30/60 proppant aggregates is much higher than in the proppant pack. Adwan 20/40 sand is a lower quality sand, which has more than 10% fines at 4,000 psi and lower proppant pack conductivity than CARBOHSP30/60 proppant at the closure stress of 12,000 psi. The expected performance of Adwan 20/40 sand when formed into an aggregate with a binding agent and a suitable channel should be of lower performance than CARBOHSP 30/60 proppant similarly formed into an aggregate with a binding agent and a suitable channel. However, unexpectedly, the channel conductivity of a proppant aggregate of Adwan 20/40 sand exceeded the conductivity of a proppant aggregate of CARBOHSP 30/60 proppant. Tables 9-14 indicate that a channel exists because the cross sectional area of the aggregate is less than the cross sectional area of the cell. In addition, the stress on the proppant aggregates with "subpar" particulates is much higher than on a conventional proppant pack, as the aggregate area is less than the cell area. Adwan 20/40 sand particulates generate higher conductivity at a higher closure stress of 37,000 psi than CARBOHSP 30/60 proppant conductivity in a conventional proppant pack at 12,000 psi.

Therefore, the present disclosure is well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A proppant aggregate comprising:
one or more subpar proppant particulates comprising and a binding agent, the binding agent surrounds wholly or partially the one or more subpar proppant particulates and the binding agent is present in an amount of about 5% to about 20% vol/wt or wt/wt, wherein the one or more subpar proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 160° F., and wherein the one or more subpar proppant particulates and a binding agent form a plurality of spaced apart proppant pillars with a plurality of channels formed therebetween in a subterranean fracture thereby providing increased conductivity of at least 2123 mD-ft at an aggregate closure stress of about 44776 psi.

2. The proppant aggregate of claim 1, wherein the one or more subpar proppant particulates have a crush resistance of greater than about 10% fines when exposed to the operational conditions.

3. The proppant aggregate of claim 1, wherein the one or more subpar proppant particulates have a mean unit mesh particle size of less than about 3000 micrometers when exposed to the operational conditions.

4. The proppant aggregate of claim 1, wherein the one or more subpar proppant particulates have a mean unit mesh particle size of less than about 3000 micrometers prior to exposure to the operational conditions, such that the one or more subpar proppant particulates at least have not experienced the closure stress.

5. The proppant aggregate of claim 1, wherein the one or more subpar proppant particulates in the absence of the binding agent pack together to exhibit a porosity of less than about 45% when exposed to the operational conditions.

6. The proppant aggregate of claim 1, wherein the one or more subpar proppant particulates in the absence of the binding agent pack together to exhibit a porosity of less than about 45% prior to exposure to the operational conditions, such that the proppant particulates at least have not experienced the closure stress.

7. The proppant aggregate of claim 1, wherein the one or more subpar proppant particulates have a sphericity and a roundness of less than about 0.9.

8. The proppant aggregate of claim 1, wherein (1) the one or more subpar proppant particulates have a crush resistance of greater than about 10% fines when exposed to the operational conditions, (2) wherein the one or more subpar proppant particulates have a mean unit mesh particle size of less than about 3000 micrometers when exposed to the operational conditions, (3) wherein the one or more subpar proppant particulates in the absence of the binding agent pack together to exhibit a porosity of less than about 45% when exposed to the operational conditions, and (4) wherein the one or more subpar proppant particulates have a sphericity and roundness of less than about 0.9.

9. The proppant aggregate of claim 1, wherein (1) the one or more subpar proppant particulates have a crush resistance of greater than about 10% fines when exposed to the operational conditions, (2) the one or more subpar proppant particulates have a mean unit mesh particle size of less than about 3000 micrometers prior to exposure to the operational conditions, such that the proppant particulates at least have not experienced the closure stress, (3) the one or more subpar proppant particulates in the absence of the binding agent pack together to exhibit a porosity of less than about 45% prior to exposure to the operational conditions, such that the proppant particulates at least have not experienced the closure stress, and (4) wherein the one or more subpar proppant particulates have a sphericity and roundness of less than about 0.9.

10. The proppant aggregate of claim 1, wherein the one or more subpar proppant particulates in the absence of the binding agent pack together to exhibit a conductivity of less than 2900 millidarcy-feet when exposed to operational conditions.

11. The proppant aggregate of claim 1, wherein the one or more subpar proppant particulates exhibit one or more properties of mechanical strength that fail to meet proppant characteristics according to International Organization of Standardization (ISO) 13503-2, Amendment 1, 2006.

12. A method comprising:
introducing proppant aggregates comprising into a subterranean formation, the proppant aggregates comprising one or more subpar proppant particulates and a binding agent, the binding agent surrounds wholly or partially the one or more subpar proppant particulates and the binding agent is present in an amount of 12% to about 20% vol/wt or wt/wt, wherein the one or more subpar proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 160° F.;

placing the proppant aggregates into at least one fracture in a subterranean formation forming a plurality of spaced apart proppant pillars having a plurality of channels formed therebetween wherein the plurality of spaced apart proppant pillars with the plurality of channels formed therebetween in the subterranean fracture provide increased conductivity of at least 2123 mD-ft at an aggregate closure stress of about 44776 psi; and removing hydraulic pressure from the subterranean formation, thereby exposing the proppant aggregates to the operational conditions in the fracture.

13. The method of claim 12, wherein the one or more subpar proppant particulates have a crush resistance of greater than about 10% fines when exposed to the operational conditions.

14. The method of claim 12, wherein the one or more subpar proppant particulates have a mean unit mesh particle size of less than about 3000 micrometers when exposed to the operational conditions.

15. The method of claim 12, wherein the one or more subpar proppant particulates have a mean unit mesh particle size of less than about 3000 micrometers prior to exposure to the operational conditions, such that the one or more subpar proppant particulates at least have not experienced the closure stress.

16. The method of claim 12, wherein the one or more subpar proppant particulates in the absence of the binding agent pack together to exhibit a porosity of less than about 45% when exposed to the operational conditions.

17. The method of claim 12, wherein the one or more subpar proppant particulates in the absence of the binding agent pack together to exhibit a porosity of less than about 45% prior to exposure to the operational conditions, such that the proppant particulates at least have not experienced the closure stress.

18. The method of claim 12, wherein the one or more subpar proppant particulates have a sphericity and roundness of less than about 0.9.

19. The method of claim 12, wherein (1) the one or more subpar proppant particulates have a crush resistance of greater than about 10% fines when exposed to the operational conditions, (2) wherein the one or more subpar proppant particulates have a mean unit mesh particle size of less than about 3000 micrometers when exposed to the operational conditions, (3) wherein the one or more subpar proppant particulates in the absence of the binding agent pack together to exhibit a porosity of less than about 45% when exposed to the operational conditions, and (4) wherein the one or more subpar proppant particulates have a sphericity and roundness of less than about 0.9.

20. The method of claim 12, wherein (1) the one or more subpar proppant particulates have a crush resistance of greater than about 10% fines when exposed to the operational conditions, (2) the one or more subpar proppant particulates have a mean unit mesh particle size of less than about 3000 micrometers prior to exposure to the operational conditions, such that the proppant particulates at least have not experienced the closure stress, (3) the one or more subpar proppant particulates in the absence of the binding agent pack together to exhibit a porosity of less than about 45% prior to exposure to the operational conditions, such that the proppant particulates at least have not experienced the closure stress, and (4) wherein the one or more subpar proppant particulates have a sphericity and roundness of less than about 0.9.

21. A method of claim 12, wherein the one or more subpar proppant particulates in the absence of the binding agent pack together to exhibit a conductivity of less than 2900 millidarcy-feet when exposed to operational conditions.

22. The method of claim 12, wherein the one or more subpar proppant particulates exhibit one or more properties of mechanical strength that fail to meet proppant characteristics according to International Organization of Standardization (ISO) 13503-2, Amendment 1, 2006.

23. A system comprising:
   a tubular extending into a subterranean formation and fluidly coupled to a pump, the tubular containing proppant aggregates comprising one or more subpar proppant particulates of aluminum oxide and a binding agent, the binding agent surrounds wholly or partially the one or more subpar proppant particulates and the binding agent is present in an amount of about 5% to about 20% vol/wt or wt/wt,
   wherein the proppant particulates in the absence of the binding agent pack together to exhibit a conductivity of less than about 3000 millidarcy-feet when exposed to operational conditions, the operational conditions having a closure stress of greater than about 1000 pounds per square inch and a temperature of greater than about 160° F., and
   wherein the proppant aggregates form a plurality of spaced apart proppant pillars with a plurality of channels formed therebetween in a subterranean fracture, wherein the plurality of spaced apart proppant pillars with the plurality of channels formed therebetween in the subterranean fracture provide increased conductivity of at least 2123 mD-ft at an aggregate closure stress of about 44776 psi.

24. The system of claim 23, wherein the one or more subpar proppant particulates have a crush resistance of greater than about 10% fines when exposed to the operational conditions.

25. The system of claim 23, wherein the one or more subpar proppant particulates in the absence of the binding agent pack together to exhibit a conductivity of less than 2900 millidarcy-feet when exposed to operational conditions, and the one or more subpar proppant particulates exhibit a plurality of mechanical strength properties that fail to meet proppant characteristics according to International Organization of Standardization (ISO) 13503-2, Amendment 1, 2006.

* * * * *